US011793169B2

(12) United States Patent
Jennings et al.

(10) Patent No.: US 11,793,169 B2
(45) Date of Patent: Oct. 24, 2023

(54) ANIMAL WEARABLE DEVICE ADJUSTMENT MECHANISMS AND METHODS

(71) Applicant: Barttron Inc., Baltimore, MD (US)

(72) Inventors: Brandon Matthew Jennings, Summverville, SC (US); Jared Scott Marmen, Bel Air, MD (US)

(73) Assignee: Barttron Inc., Bel Air, MD (US)

( * ) Notice: Subject to any disclaimer, the term of this patent is extended or adjusted under 35 U.S.C. 154(b) by 1078 days.

(21) Appl. No.: 16/435,732

(22) Filed: Jun. 10, 2019

(65) Prior Publication Data

US 2019/0387714 A1 Dec. 26, 2019

Related U.S. Application Data

(60) Provisional application No. 62/682,870, filed on Jun. 9, 2018.

(51) Int. Cl.
*A01K 27/00* (2006.01)
*B65H 75/44* (2006.01)
*B65H 75/40* (2006.01)

(52) U.S. Cl.
CPC ......... *A01K 27/001* (2013.01); *B65H 75/40* (2013.01); *B65H 75/4486* (2013.01)

(58) Field of Classification Search
CPC .... A01K 27/00; A01K 27/001; A01K 27/002; A01K 27/003; A01K 27/004;
(Continued)

(56) References Cited

U.S. PATENT DOCUMENTS

| 122,020 A | 12/1871 | Hughs |
| D20,548 S | 3/1891 | Ostergren |

(Continued)

FOREIGN PATENT DOCUMENTS

| EP | 2362238 | 8/2011 |
| JP | D1172576 | 3/2003 |
| WO | WO D066470-010 | 8/2005 |
| WO | WO D066470-016 | 8/2005 |

(Continued)

OTHER PUBLICATIONS

Bozkurt et al., "Toward Cyber-Enhanced Working Dogs for Search and Rescue," IEEE Computer Society, 2014, pp. 32-29.
(Continued)

*Primary Examiner* — Trinh T Nguyen
(74) *Attorney, Agent, or Firm* — Wilson Patent Law, LLC

(57) ABSTRACT

Methods, systems, and devices for adjusting an animal wearable devices are provided in accordance with various embodiments. For example, some embodiments include a system that may include an animal wearable device, one or more straps, and one or more strap length adjustment mechanisms coupled with the one or more straps; the one or more strap length adjustment mechanisms that may be coupled with the animal wearable device. The strap length adjustment mechanism may include a variety of components such as a take-up spool and tension component(s). Some embodiments may utilize a motor coupled with the take-up spool and a microcontroller. Some embodiments include methods of utilizing the strap length adjustment mechanism(s) to adjust the fit of the animal wearable device.

16 Claims, 15 Drawing Sheets

(58) Field of Classification Search
CPC .. A01K 27/005; A01K 27/006; A01K 27/008; A01K 27/009; A01K 15/021; A01K 15/022
See application file for complete search history.

(56) References Cited

U.S. PATENT DOCUMENTS

| | | |
|---|---|---|
| 1,498,126 A | 6/1924 | Smith |
| 1,739,689 A | 12/1929 | Newman |
| 2,101,690 A | 12/1937 | Sauer |
| D136,736 S | 11/1943 | Mercer |
| 2,361,108 A | 10/1944 | Johnson |
| D163,375 S | 5/1951 | Elsinger |
| 2,612,139 A | 9/1952 | Collins |
| 2,681,453 A | 6/1954 | Lane |
| 2,741,224 A | 4/1956 | Putnam |
| 3,827,403 A | 8/1974 | Meyer |
| D241,314 S | 9/1976 | Hug |
| 4,919,082 A | 4/1990 | Tsai |
| D309,277 S | 7/1990 | Mejias |
| 5,054,428 A | 10/1991 | Farkus |
| D326,823 S | 6/1992 | Wunderman |
| 5,207,178 A | 5/1993 | McDade |
| 5,228,012 A | 7/1993 | Seager |
| 5,241,923 A | 9/1993 | Janning |
| D344,449 S | 2/1994 | Ward |
| D344,629 S | 3/1994 | Steffek |
| D346,482 S | 5/1994 | Merrill |
| 5,331,725 A | 7/1994 | Chou |
| D354,158 S | 1/1995 | Trudeau |
| 5,443,039 A | 8/1995 | Suchowski |
| 5,456,656 A | 10/1995 | Skovira |
| 5,494,002 A | 2/1996 | Greene |
| D368,567 S | 4/1996 | Chase |
| 5,666,702 A | 9/1997 | Ming-Chieh |
| D388,333 S | 12/1997 | Wunderman |
| D391,145 S | 2/1998 | Costa |
| 5,749,324 A | 5/1998 | Moore |
| D396,651 S | 8/1998 | Wunderman |
| 5,815,077 A | 9/1998 | Christiansen |
| D400,458 S | 11/1998 | Titus |
| D401,181 S | 11/1998 | Houlihan |
| 5,829,374 A | 11/1998 | Hede |
| 5,857,433 A | 1/1999 | Files |
| 5,911,198 A | 6/1999 | Curen |
| D416,205 S | 11/1999 | Aellen |
| D418,636 S | 1/2000 | Marconi |
| 6,016,772 A | 1/2000 | Noyes |
| D421,920 S | 3/2000 | Bodino |
| D426,699 S | 6/2000 | Dickerson |
| 6,131,535 A | 10/2000 | So |
| 6,167,843 B1 | 1/2001 | Kim |
| 6,271,757 B1 | 8/2001 | Touchton |
| 6,273,027 B1 | 8/2001 | Watson |
| D456,957 S | 5/2002 | Koch |
| 6,401,095 B1 | 6/2002 | Adler |
| 6,412,430 B1 | 7/2002 | Johnston |
| 6,431,121 B1 | 8/2002 | Mainini |
| D468,492 S | 1/2003 | Wilhelm |
| 6,600,422 B2 | 7/2003 | Barry |
| 6,651,592 B2 | 11/2003 | Maddox |
| D487,482 S | 3/2004 | Disher |
| D493,728 S | 8/2004 | Modolo |
| D503,248 S | 3/2005 | Linton |
| D503,501 S | 3/2005 | Linton |
| 6,900,731 B2 | 5/2005 | Kreiner |
| 6,903,682 B1 | 6/2005 | Maddox |
| 6,912,975 B1 * | 7/2005 | Balan .................. A01K 27/004 119/796 |
| D510,282 S | 10/2005 | Modolo |
| D530,046 S | 10/2006 | Lord |
| D530,226 S | 10/2006 | Senggen |
| D530,627 S | 10/2006 | Senggen |
| D562,175 S | 2/2008 | Miller |
| 7,385,513 B2 | 6/2008 | Everest |
| 7,421,979 B2 | 9/2008 | Kim |
| D592,509 S | 5/2009 | Lecoutre |
| D608,236 S | 1/2010 | Akdemir |
| 7,640,639 B2 | 1/2010 | de Bien |
| D609,408 S | 2/2010 | Labelson |
| 7,667,607 B2 | 2/2010 | Gerig |
| 7,705,736 B1 | 4/2010 | Kedziora |
| 7,770,541 B2 | 8/2010 | Boyd |
| 7,845,313 B1 | 12/2010 | Yates |
| D643,159 S | 8/2011 | Howitz |
| D645,213 S | 9/2011 | Silverman |
| D651,365 S | 12/2011 | Marschke |
| 8,069,823 B2 | 12/2011 | Mainini |
| D672,512 S | 12/2012 | Reed |
| 8,336,504 B1 * | 12/2012 | Geis .................. A01K 27/001 119/796 |
| 8,543,134 B2 | 9/2013 | Lopez |
| D694,107 S | 11/2013 | Didio |
| D699,405 S | 2/2014 | McKinnell |
| D704,588 S | 5/2014 | DiPietro |
| D708,794 S | 7/2014 | Monsalve |
| D711,761 S | 8/2014 | Savoy |
| 8,851,019 B2 | 10/2014 | Jesurum |
| 8,854,215 B1 | 10/2014 | Ellis |
| D718,169 S | 11/2014 | Birnbaum |
| D733,525 S | 7/2015 | Petzl |
| D741,145 S | 10/2015 | Petzl |
| 9,226,479 B2 | 1/2016 | Bianchi |
| 9,449,487 B1 | 9/2016 | Spitalny |
| D777,998 S | 1/2017 | Pantazes |
| 9,538,725 B2 | 1/2017 | Bianchi |
| D781,171 S | 3/2017 | Akana |
| D797,400 S | 9/2017 | Diles |
| D808,644 S | 1/2018 | Overton |
| D809,953 S | 2/2018 | Gilmore |
| 9,943,066 B2 | 4/2018 | Zhao |
| D817,802 S | 5/2018 | Dumas |
| D817,803 S | 5/2018 | Dumas |
| 9,999,201 B2 | 6/2018 | Lutz |
| 10,251,371 B1 | 4/2019 | Landers |
| D850,969 S | 6/2019 | Brown |
| D854,945 S | 7/2019 | Dumas |
| D855,408 S | 8/2019 | Tsai |
| D858,903 S | 9/2019 | Jennings |
| D869,554 S | 12/2019 | Despres |
| D879,645 S | 3/2020 | Lin |
| D879,646 S | 3/2020 | Lin |
| D887,651 S | 6/2020 | Durrant |
| D896,119 S | 9/2020 | Park |
| D928,424 S | 8/2021 | Waddick |
| 2002/0046713 A1 | 4/2002 | Otto |
| 2004/0100386 A1 | 5/2004 | Tendler |
| 2005/0000469 A1 | 1/2005 | Giunta |
| 2005/0145203 A1 | 7/2005 | Wang |
| 2006/0027186 A1 | 2/2006 | Giunta |
| 2006/0219187 A1 | 10/2006 | Krishnamurthy |
| 2006/0278179 A1 | 12/2006 | Vasquez |
| 2008/0035072 A1 | 2/2008 | Lee |
| 2008/0156277 A1 | 7/2008 | Mainini |
| 2009/0038670 A1 | 2/2009 | Shu |
| 2009/0095233 A1 | 4/2009 | Trujillo |
| 2009/0102668 A1 | 4/2009 | Thompson |
| 2009/0173343 A1 | 7/2009 | Omura |
| 2011/0174238 A1 * | 7/2011 | Dagnon ............... A01K 27/004 119/794 |
| 2011/0215935 A1 | 9/2011 | Zehavi |
| 2011/0221597 A1 | 9/2011 | Jameson |
| 2012/0018250 A1 | 1/2012 | Smith |
| 2013/0092099 A1 | 4/2013 | Hardi |
| 2013/0157628 A1 | 6/2013 | Bryant |
| 2013/0174616 A1 * | 7/2013 | Allen, Jr. ............ A01K 27/001 119/793 |
| 2013/0269628 A1 | 10/2013 | Holt |
| 2013/0272560 A1 | 10/2013 | Dougherty |
| 2013/0285815 A1 | 10/2013 | Jones |
| 2014/0261235 A1 | 9/2014 | Rich |
| 2014/0352632 A1 | 12/2014 | McLaughlin |
| 2015/0020750 A1 | 1/2015 | Jesurum |
| 2015/0040839 A1 | 2/2015 | Goetzl |

(56) References Cited

U.S. PATENT DOCUMENTS

| | | | |
|---|---|---|---|
| 2016/0015004 A1 | 1/2016 | Bonge | |
| 2016/0113245 A1* | 4/2016 | Swanger | A01K 27/004 |
| | | | 119/792 |
| 2016/0144404 A1 | 5/2016 | Houston | |
| 2016/0183390 A1 | 6/2016 | Yang | |
| 2017/0055055 A1 | 2/2017 | Albanese | |
| 2017/0094946 A1 | 4/2017 | Giunta | |
| 2017/9135315 | 5/2017 | Marmen | |
| 2018/0110205 A1 | 4/2018 | Czamecky | |
| 2019/0379105 A1 | 12/2019 | Sayem | |

FOREIGN PATENT DOCUMENTS

| | | | | |
|---|---|---|---|---|
| WO | WO 2013/184936 | | 12/2013 | |
| WO | WO 2014/162154 | | 10/2014 | |
| WO | WO-2015168396 A1 * | 11/2015 | | A01K 15/02 |
| WO | WO 2017/087363 | | 5/2017 | |

OTHER PUBLICATIONS

Golan, Y. et al., "A Vibrotactile Vest for Remote Human-Dog Communication," 2019 IEEE World Haptics Conference, Jul. 9-12, 2019.

31 inch Round End EPDM Rubber Tie Down Hook Strap Cord Bungee, published Sep. 28, 2020 [online], [retrieved May 6, 2021], Available from Internet, URL: <http://web.archive.org/web/20200928102258/https://xtremepowerusa.com/?products/31-round-end-epdm-rubber-tie-down-hook-strap-cord-bungee-1-piece-black>.

Captain Shackle Bracelet, published 2019 [online], [retrieved Apr. 11, 2018], Available from Internet, URL: <https://northwrist.com/collections/nautical-bracleets/products/captain-shackle-bracelet?variant=17604053434433>.

Chord, published Feb. 7, 2016 [online], [retrieved Oct. 24, 2018], Available from Internet, URL: <https://www.youtube.com/watch?v=jpyPXgvMJw> @ approximately 1:46.

Hold Fast Leather Bracelet, published Sep. 27, 2020 [online], [retrieved May 6, 2021], Available from Internet, URL: <http://web.archive.org/web/20200927182055/https://www.jamesavery.com/products/leather-bracelet-with-hold-fast-buckle>.

Introducing Chord, published Jun. 25, 2018 [online], [retrieved Oct. 24, 2018], Available from Internet, URL: <https://www.youtube.com/watch?v=SfogyV9LCEQ> ©approximately 3:19.

Teething Bracelet for Mom_Capri Silicone Cuff in Stone, published Jul. 3, 2018 [online], ][retrieved May 6, 2021], Available from Internet, URL: <https://www.anjieandash.com/products/teething-bracelet-capri-silicone-cuff-in-stone>.

* cited by examiner

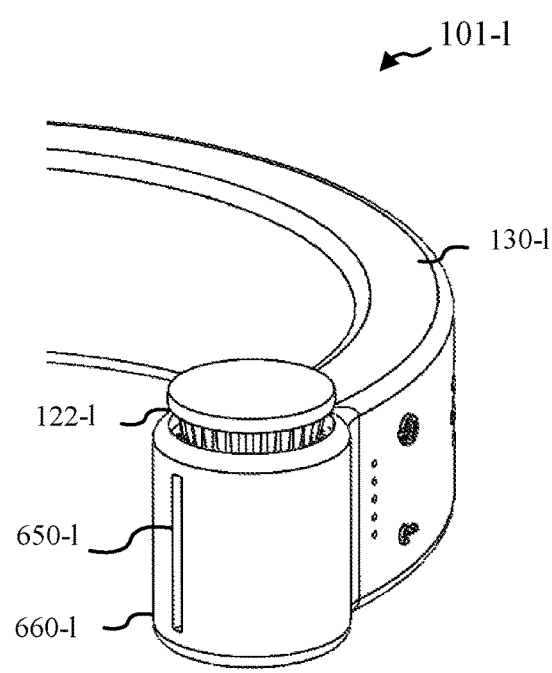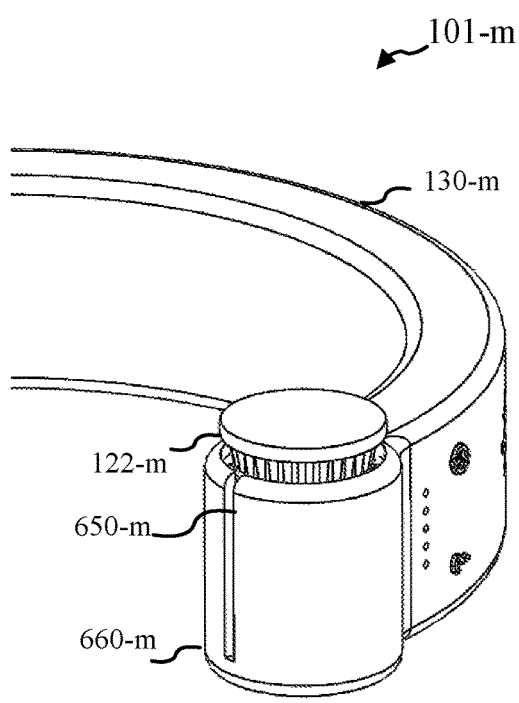
FIG. 7A  FIG. 7B
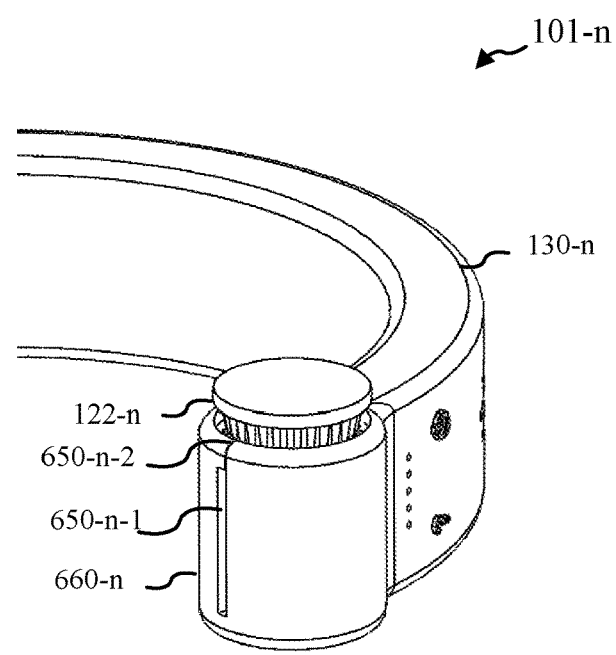
FIG. 7C

900

Adjust a fit of an animal wearable device utilizing a strap length adjustment mechanism
910

FIG. 9

ANIMAL WEARABLE DEVICE ADJUSTMENT MECHANISMS AND METHODS

CROSS REFERENCES TO RELATED APPLICATIONS

This application is a non-provisional patent application claiming priority benefit of U.S. provisional patent application Ser. No. 62/682,870 filed on Jun. 9, 2018 and entitled "ANIMAL WEARABLE DEVICE ADJUSTMENT MECHANISMS AND METHODS," the entire disclosure of which is herein incorporated by reference for all purposes.

BACKGROUND

Animal wearable devices (e.g., animal collars, harnesses, bridles, etc.) generally involve adjustment and/or closure to fit individual animals. Different issues may arise when trying to make adjustment and/or closure of animal wearable devices. There may be a need for new tools and techniques that may facilitate adjustment and/or closure of animal wearable devices.

SUMMARY

Methods, systems, and devices for adjusting animal wearable devices are provided in accordance with various embodiments. For example, some embodiments include a system that may include one or more straps and one or more strap length adjustment mechanisms coupled with the one or more straps; the one or more strap length adjustment mechanisms may be coupled with an animal wearable device.

In some embodiments, a first strap length adjustment mechanism from the one or more strap length adjustment mechanisms is configured to couple with a first end of the animal wearable device and a second strap length adjustment mechanism from the one or more strap length adjustment mechanisms is configured to couple with a second end of the animal wearable device.

In some embodiments, the animal wearable device includes an animal collar. Other animal wearable devices may include animal harnesses, for example.

In some embodiments, each of the one or more strap length adjustment mechanisms include a take-up spool coupled with an end of at least one of the one or more straps. In some embodiments, each of the one or more strap length adjustment mechanisms include an enclosure component configured to hold a portion of the take-up spool and a portion of at least one of the one or more straps. Some embodiments include one or more tension components coupled with the take-up spool to facilitate spooling a portion of the one or more straps around the take-up spool. In some embodiments, the one or more tension components include one or more springs. In some embodiments, the one or more strap length adjustment mechanisms include one or more motors coupled with the one or more take-up spools; the one or more motors may act as tension components in some embodiments. Some embodiments include a microcontroller that controls the one or more motors.

In some embodiments, the take-up spool is configured to adjust an extended length of at least one of the one or more straps. In some embodiments, the one or more strap length adjustment mechanisms are configured to maintain the adjusted extended length of the one or more straps.

In some embodiments, the one or more strap length adjustment mechanisms is configured for at least removal of the take-up spool or replacement of the one or more straps. In some embodiments, the one or more strap length adjustment mechanisms include a spring-loaded plunger configured to facilitate at least locking, adjusting, or removing the take-up spool. Some embodiments include a spring configured to push up the take-up spool when the spring-loaded plunger is pushed. In some embodiments, the take-up spool includes one or more splines to facilitate locking the take-up spool.

Some embodiments include a leash attachment component coupled with the one or more straps. In some embodiments, the leash attachment component includes a D ring.

In some embodiments, the animal wearable device includes one or more overmolding portions configured to couple with the one or more strap length adjustment mechanisms. In some embodiments, the one or more overmolding portions include at least one or more apertures or one or more slits configured for the one or more straps at least to pass through the overmolding portions or to be removed from the overmolding portions.

Some embodiments include a method that may include adjusting a fit of an animal wearable device utilizing one or more strap length adjustment mechanisms. The animal wearable device may include an animal collar, for example.

In some embodiments, adjusting the fit of the animal wearable device utilizing the one or more strap length adjustment mechanisms includes rotating a take-up spool coupled with an end of a strap. In some embodiments, adjusting the fit of the animal wearable device utilizing the one or more strap length adjustment mechanisms includes utilizing one or more tension components coupled with the take-up spool to facilitate spooling a portion of the strap around the take-up spool. The one or more tension components may include one or more springs.

In some embodiments, adjusting the fit of the animal wearable device utilizing the one or more strap length adjustment mechanisms includes utilizing a spring-loaded plunger configured to facilitate at least locking, adjusting, or removing the take-up spool. Some embodiments include locking a position of the take-up spool after adjusting the fit of the animal wearable device.

In some embodiments, adjusting the fit of the animal wearable device utilizing the one or more strap length adjustment mechanisms includes utilizing a motor coupled with the take-up spool. Some embodiments include controlling the motor utilizing a microcontroller. The motor may be considered a tension component. Adjusting the fit of the animal wearable device utilizing the one or more strap length adjustment mechanisms that includes utilizing the motor coupled with the take-up spool and the microcontroller controlling the motor may include adjusting the fit of the animal wearable device based on a size of an animal wearing the animal wearable device. Adjusting the fit of the animal wearable device utilizing the one or more strap length adjustment mechanisms that includes utilizing the motor coupled with the take-up spool and the microcontroller controlling the motor may include measuring a tension with respect to strap length adjustment mechanism. Adjusting the fit of the animal wearable device utilizing the one or more strap length adjustment mechanisms that includes utilizing the motor coupled with the take-up spool and the microcontroller controlling the motor may include adjusting the fit of the animal wearable device based one or more stored length values with respect to an animal wearing the animal wearable device. Adjusting the fit of the animal wearable device utilizing the one or more strap length adjustment mechanisms that includes utilizing the motor coupled with the take-up spool and the microcontroller controlling the motor may include adjusting the fit of the animal wearable device based on a state of an animal wearing the animal wearable device. Adjusting the fit of the animal wearable device utilizing the one or more strap length adjustment mechanisms that includes utilizing the motor coupled with the take-up spool and the microcontroller controlling the motor may include determining the fit of the animal wearable device based on a number of rotations of the take-up spool. Adjusting the fit of the animal wearable device utilizing the one or more strap length adjustment mechanisms that includes utilizing the motor coupled with the take-up spool and the microcontroller controlling the motor may include adjusting the fit of the animal wearable device based a time of day.

Some embodiments include passing a length of the strap through at least an aperture of an overmolding portion of the animal wearable device.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 7A, FIG. 7B, and FIG. 7C show systems and/or devices in accordance with various embodiments.

FIG. 9 shows a flow diagram of a method in accordance with various embodiments.

DETAILED DESCRIPTION

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Methods, systems, and devices for adjusting animal wearable devices are provided in accordance with various embodiments. For example, some embodiments include a device that may include one or more straps and one or more strap length adjustment mechanisms coupled with the one or more straps; the one or more strap length adjustment mechanisms may be configured to couple with an animal wearable device. A system may be formed from coupling the one or more strap length adjustment mechanism with the animal wearable device.

The use of adjustment mechanisms in accordance to various embodiments may adjust a fit of an animal wearable device that may allow the animal wearable device to be adjusted to the size of animal, such as the neck of an animal when the animal wearable device includes an animal collar; the adjustment may thus be configured such that the animal wearable device fits the animal appropriately. Some embodiments allow a user to adjust the adjustment mechanism manually, while some embodiments may utilize mechanical (e.g., springs) or electrical components (e.g., motors) to adjust the adjustment mechanism either automatically or in response to signals sent to the adjustment mechanism, such as from a microcontroller.

The adjustment mechanism may also allow for a variety of additional benefits for some embodiments, such as providing information about the animal or communicating with the animal, such as for training purposes. For example, in some embodiments, the adjustment mechanism may be controlled with a microcontroller. The adjustment mechanism may be referred to as a strap length adjustment mechanism.

Figure 1A:
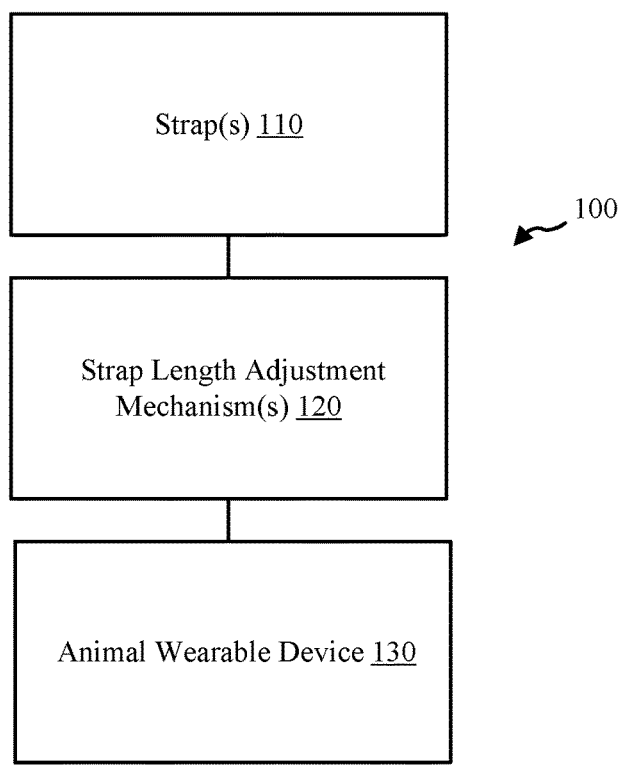
FIG. 1A, FIG. 1B, and FIG. 1C shows systems and/or devices in accordance with various embodiments.

Turning now to FIG. 1A, a system 101 in accordance with various embodiments is provided. System 101 may include a device 100 that may provide one or more adjustment mechanisms for animal wearable devices. For example, device 100 may include one or more straps 110 and one or more strap length adjustment mechanisms 120 coupled with the one or more straps 110; the one or more strap length adjustment mechanisms 120 may be coupled with an animal wearable device 130 to form the system 101. Device 100 may be referred to as an adjustment mechanism in general.

In some embodiments, a first strap length adjustment mechanism from the one or more strap length adjustment mechanisms 120 is configured to couple with a first end of the animal wearable device 130 and a second strap length adjustment mechanism from the one or more strap length adjustment mechanisms 120 is configured to couple with a second end of the animal wearable device 130.

In some embodiments, the animal wearable device 130 includes an animal collar. Other animal wearable devices 130 may include, but not limited to, animal harnesses and/or bridles, for example. The animal wearable device 130 may be referred to in general as a securing device that may be configured to be worn by an animal. The one or more straps 110 may include a wide variety of generally elongated members of different types and sizes including, but not limited to, flat straps, round cords, ropes, or cables, and/or linked chain components.

In some embodiments, each of one or more strap length adjustment mechanisms 120 include a take-up spool coupled with an end of at least one of the one or more straps 110. In some embodiments, each of the one or more strap length adjustment mechanisms 120 include an enclosure component configured to hold a portion of the take-up spool and a portion of at least one of the one or more straps 110. Some embodiments include one or more tension components coupled with the take-up spool to facilitate spooling a portion of the one or more straps 110 around the take-up spool. In some embodiments, the one or more tension components include one or more springs. In some embodiments, the one or more strap length adjustment mechanisms 120 include one or more motors coupled with the one or more take-up spools; the one or more motors may act as tension components in some embodiments. Some embodiments include a microcontroller that controls the one or more motors.

In some embodiments, the take-up spool is configured to adjust an extended length of at least one of the one or more straps 110. In some embodiments, the one or more strap length adjustment mechanisms 120 are configured to maintain the adjusted extended length of the one or more straps 110.

In some embodiments, the one or more strap length adjustment mechanisms 120 is configured for at least removal of the take-up spool or replacement of the one or more straps 110. In some embodiments, the one or more strap length adjustment mechanisms 120 include a spring-loaded plunger configured to facilitate at least locking, adjusting, or removing the take-up spool. Some embodiments include a spring configured to push up the take-up spool when the spring-loaded plunger is pushed. In some embodiments, the take-up spool includes one or more splines to facilitate locking the take-up spool.

Some embodiments include a leash attachment component coupled with the one or more straps 110. In some embodiments, the leash attachment component includes a D ring.

In some embodiments, the animal wearable device 130 includes one or more overmolding portions configured to couple with the one or more strap length adjustment mechanisms 120. In some embodiments, the one or more overmolding portions include at least one or more apertures or one or more slits configured for the one or more straps 110 at least to pass through the overmolding portions or to be removed from the overmolding portions.

Figure 1B:
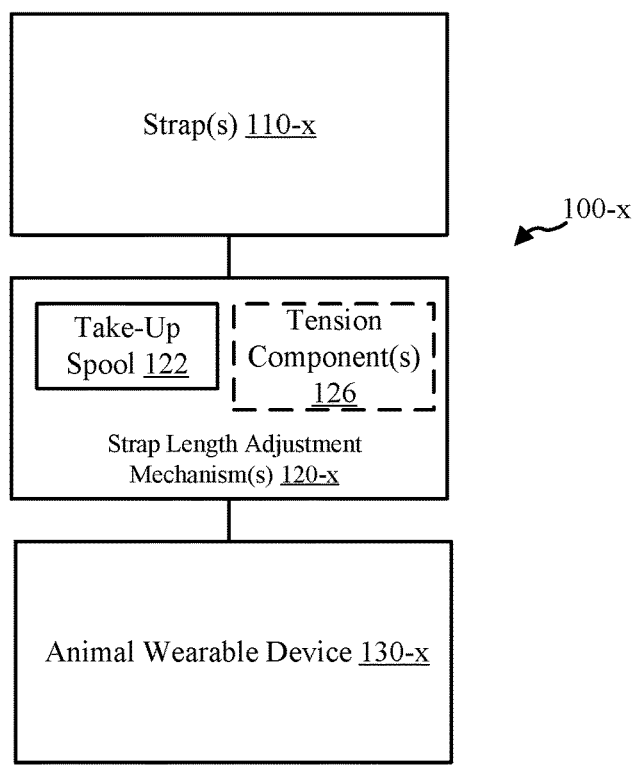

FIG. 1B shows an example of a system 101-x in accordance with various embodiments is provided. System 101-x may be an example of system 101 of FIG. 1A. System 101-x may include a device 100-x that may provide one or more adjustment mechanisms for animal wearable device 130-x. For example, device 100-x may include one or more straps 110-x and one or more strap length adjustment mechanisms 120-x coupled with the one or more straps 110-x; the one or more strap length adjustment mechanisms 120-x may be coupled with an animal wearable device 130-x. Device 100-x may be referred to as an adjustment mechanism in general.

The strap length adjustment mechanism 120-x may include a variety of components such as a take-up spool 122 that may be coupled with an end of the strap 110-x. Some embodiments include one or more tension components 126 coupled with the take-up spool 122 to facilitate spooling a portion of the one or more straps 110-x around the take-up spool 122. In some embodiments, the one or more tension components 126 include one or more springs. In some embodiments, the one or more tension components 126 include one or more motors; the one or more motors may be controlled by one or more microcontrollers.

Figure 1C:
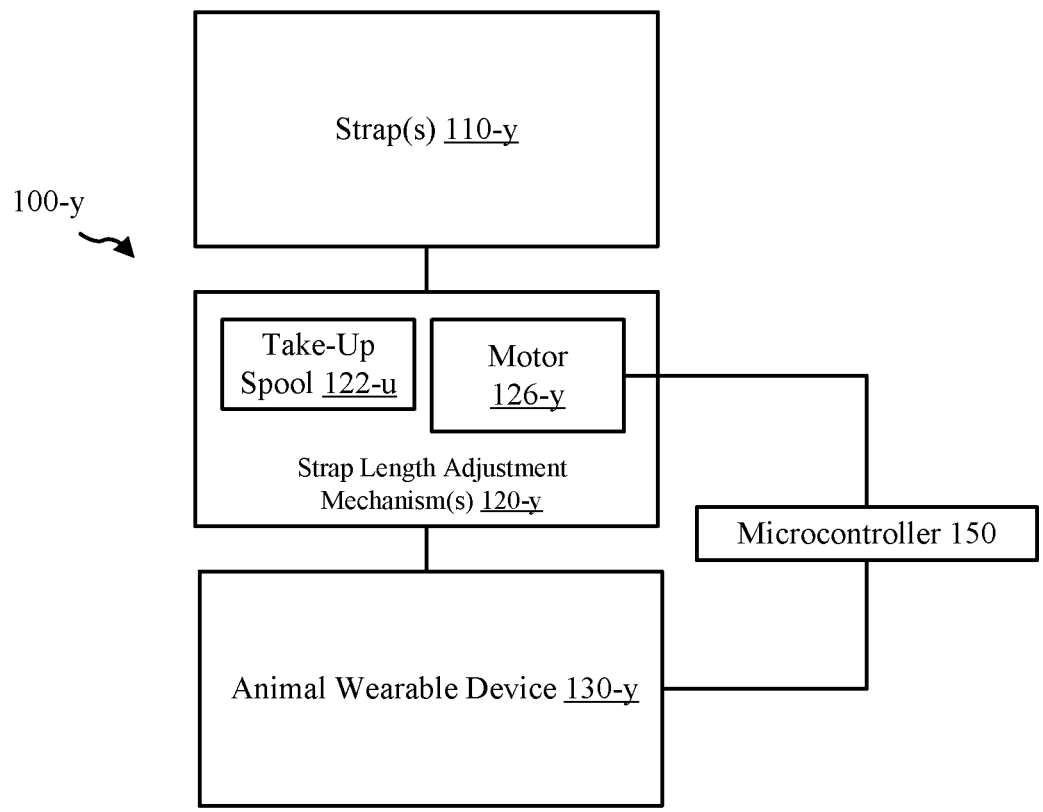

FIG. 1C provides one example of a system 101-y in accordance with various embodiments, that may be an example of system 101-x of FIG. 1B and/or system 101 of FIG. 1A. System 101-y may include a device 100-y that may provide one or more adjustment mechanisms for animal wearable device 130-y. For example, device 100-y may include one or more straps 110-y and one or more strap length adjustment mechanisms 120-y coupled with the one or more straps 110-y; the one or more strap length adjustment mechanisms 120-y may be coupled with the animal wearable device 130-y. Device 100-y may be referred to as an adjustment mechanism in general. The strap length adjustment mechanism 120-y may include a variety of components such as a take-up spool 122-y that may be coupled with an end of the strap 110-. Some embodiments include one or more motors 126-y coupled with the take-up spool to facilitate spooling a portion of the one or more straps 110-y around the take-up spool 122-y. The one or more motors 126-y may be controlled by one or more microcontrollers 150 may be coupled with the animal wearable device 130-y, though in some embodiments the microcontroller 150 may be coupled with other components, such as a pendant component. The use of aspects of system 101-y with one or more adjustment mechanisms and a microcontroller 150 are discussed in more detail herein.

Turning now to FIG. 2A, FIG. 2B, FIG. 2C, and FIG. 2D, cross-sectional views of aspects of a strap length adjustment mechanism 120-a are shown in different states or positions. The strap length adjustment mechanism 120-a may include a take-up spool 122-a, an enclosure component 124, and a spring-loaded plunger 128 (with spring 129). The strap length adjustment mechanism 120-a may be an example of the strap length adjustment mechanism 120 of FIG. 1A, FIG. 1B, and/or FIG. 1C.

Figure 2A:
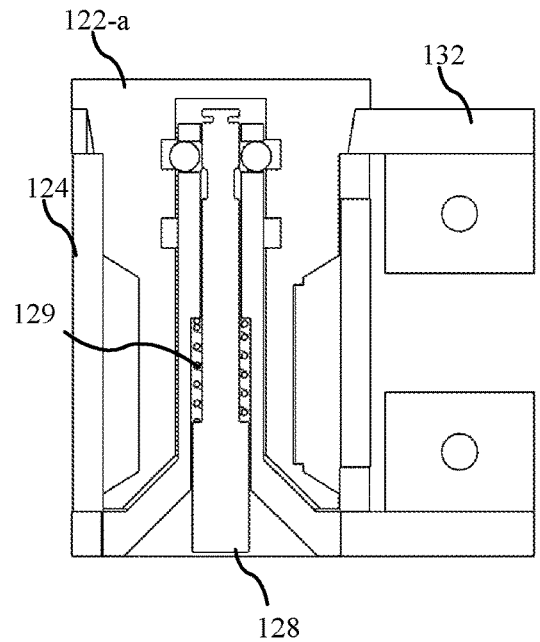
FIG. 2A, FIG. 2B, FIG. 2C, FIG. 2D, FIG. 2E, FIG. 2F, FIG. 2G, and FIG. 2H show devices in accordance with various embodiments.
Figure 2B:
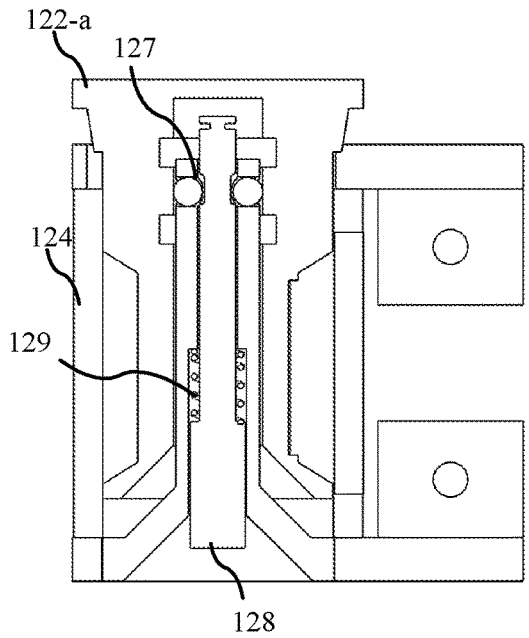
Figure 2C:
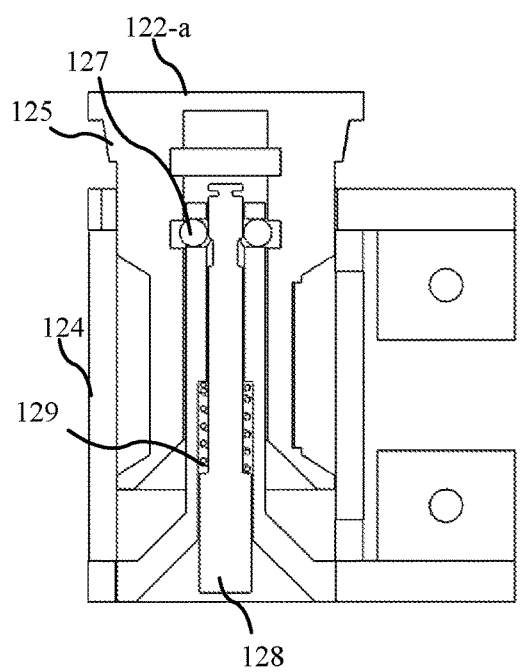
Figure 2D:
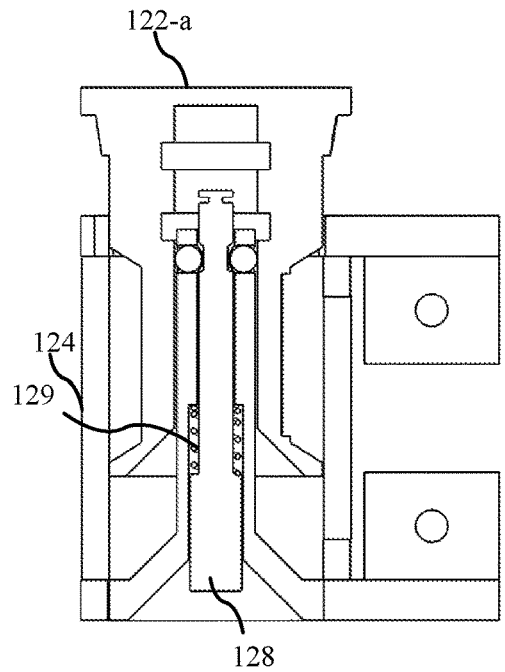

FIG. 2A may show the strap length adjustment mechanism 120-a in a locked state or position. FIG. 2B may show the strap length adjustment mechanism 120-a in an intermediate state or position. The spring-loaded plunger 128 may be pressed in this figure such that a head of the plunger 128 may push out the take-up spool 122-a. Ball detents 127 may unlock the take-up spool 122-a. FIG. 2C may show a position in which the take-up spool 122-a may freely rotate. Splines 125 of the take-up spool 122-a may not be engaged in this position, while ball detents 127 may lock an axial position. FIG. 2D may show the take-up spool 122-*a* when the spring-loaded plunger 128 may be pushed a second time, which may allow the take-up spool 122-*a* to be fully ejected or removed. Mechanism 120-*a* may include one or more connectors 132 that may be utilized to couple the mechanism 120-*a* with an animal wearable device.

In some embodiments, the take-up spool 122-*a* of the strap length adjustment mechanism 120-*a* is coupled with an end of at least one of the one or more straps. In some embodiments, the enclosure component 124 of the strap length adjustment mechanism 120-*a* may be configured to hold a portion of the take-up spool 122-*a* and a portion of at least one of the one or more straps. Some embodiments include one or more tension components coupled with the take-up spool 122-*a* to facilitate spooling a portion of the one or more straps around the take-up spool 122-*a*. In some embodiments, the one or more tension components include one or more springs and/or more or more motors.

In some embodiments, the take-up spool 122-*a* is configured to adjust an extended length of at least one of the one or more straps. In some embodiments, the strap length adjustment mechanism 120-*a* is configured to maintain the adjusted extended length of the one or more straps.

As noted above, the strap length adjustment mechanism 120-*a* may be configured for at least removal of the take-up spool 122-*a* or replacement of the one or more straps. In some embodiments, the spring-loaded plunger 128 is configured to facilitate at least locking, adjusting, or removing the take-up spool 122-*a*. The spring 129 may be configured to push up the take-up spool 122-*a* when the spring-loaded plunger 128 is pushed. In some embodiments, the take-up spool 122-*a* includes the one or more splines 125 to facilitate locking the take-up spool 122-*a*.

Figure 2E:
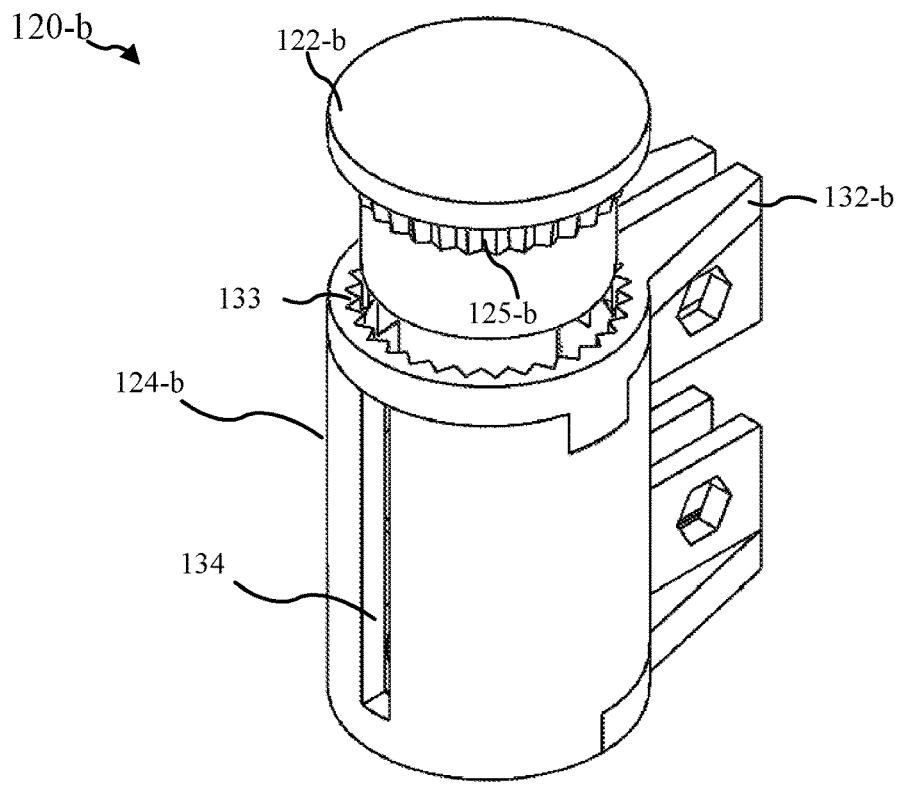

FIG. 2E shows an example of aspects of a strap length adjustment mechanism 120-*b*, which may be an example of strap length adjustment mechanism 120 of FIG. 1A, mechanism 120-*y* of FIG. 1B, and/or mechanism 120-*a* of FIGS. 2A-2D. FIG. 2E may show the strap length adjustment mechanism 120-*b* in a state where a take-up spool 122-*b* may be fully ejected or removed. FIG. 2E may also show an enclosure component 124-*b* and splines 125-*b* of take-up spool 122-*b*. In some embodiments, connector 132-*b* be coupled with the enclosure component 124-*b* and/or may include splines 133 that may mesh with the splines 125-*b* of the take-up spool 122-*b*. This may facilitate locking the take-up spool 122-*b* in different states of rotation. In some embodiments, a spring may be positioned such that the take-up spool 122-*b* may pop out once the take-up spool 122-*b* is unlocked. The enclosure component 124-*b* may also include an aperture 134 (shown as a slit) that may accommodate a strap passing through the enclosure component 124-*b*.

Figure 2F:
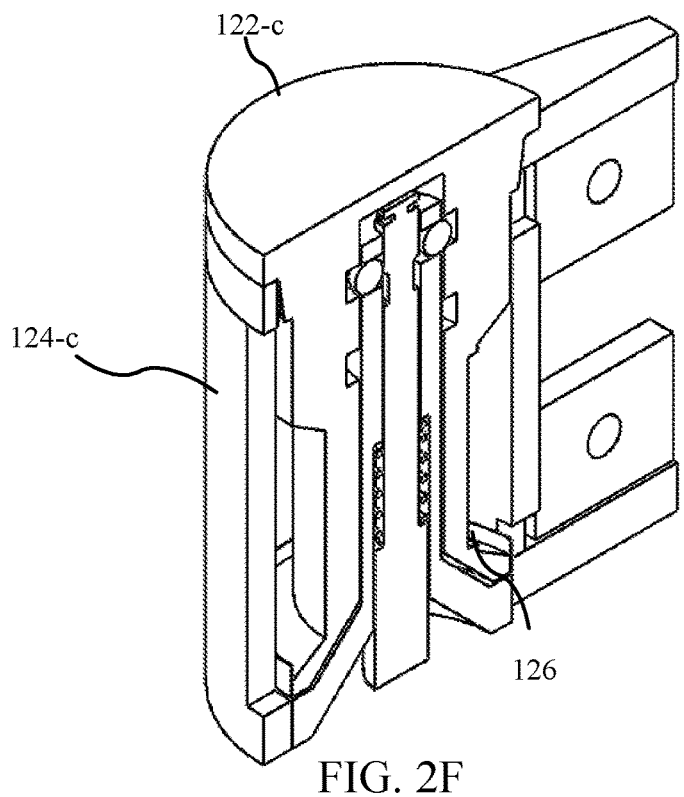

FIG. 2F shows a cross-sectional view of an example of aspects of a strap length adjustment mechanism 120-*c*, which may be an example of strap length adjustment mechanism 120 of FIG. 1A, mechanism 120-*x* of FIG. 1B, mechanism 120-*y* of FIG. 1C, mechanism 120-*a* of FIGS. 2A-2D, and/or mechanism 120-*b* of FIG. 2E. FIG. 2F may show the strap length adjustment mechanism 120-*c* in a state where a take-up spool 122-*c* is fully within an enclosure component 124-*c*. Strap length adjustment mechanism 120-*c* may include a tension component 126, such as a rotation spring to facilitate spooling or winding a strap around the take-up spool 122-*c*.

Figure 2G:
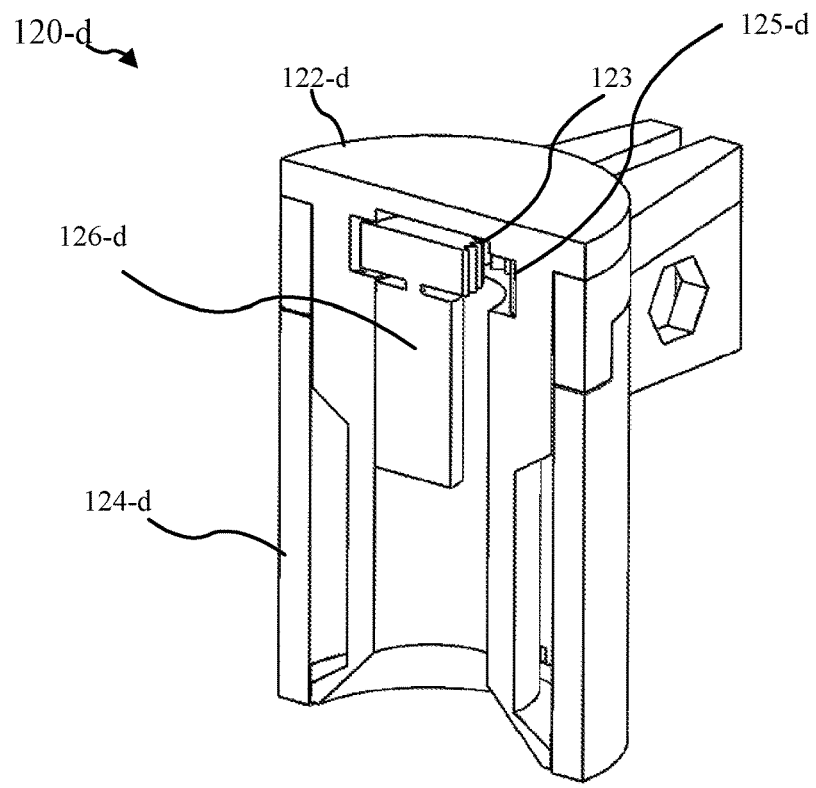
Figure 2H:
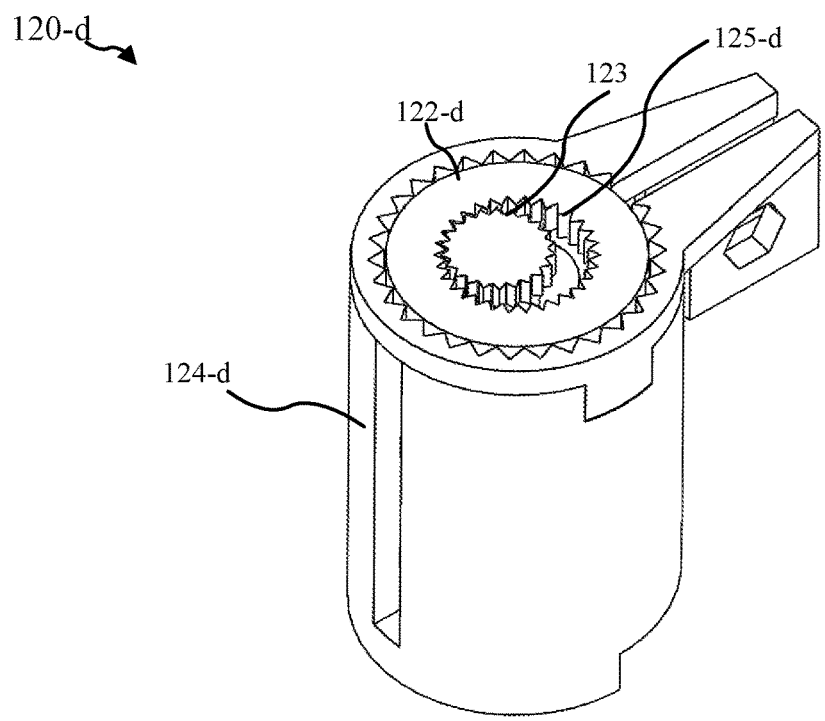

Turning now to FIG. 2G, a cross-sectional view of aspects of a strap length adjustment mechanism 120-*d* are provided in accordance with various embodiments. Mechanism 120-*d* may be an example of mechanism 120 of FIG. 1A, mechanism 120-*x* of FIG. 1B, and/or mechanism 120-*y* of FIG. 1C; mechanism 120-*d* may include aspects of mechanism 120-*a* of FIGS. 2A-2D, mechanism 120-*b* of FIG. 2E, and/or mechanism 120-*c* of FIG. 2F. Strap length adjustment mechanism 120-*d* may include a take-up spool 122-*d* that may be coupled with a motor 126-*d* through a gear 123 and splines 125-*d* of the take-up spool 122-*d*. This configuration may allow for the motor 126-*d* to adjust the length of a strap. Strap length adjustment mechanism 120-*d* may show other components, such as enclosure component 124-*d*. FIG. 2H shows another perspective of device 120-*d*, with a top portion of the take-up spool 122-*d* removed to show the gear 123 and splines 125-*d* from a top perspective.

The use of a system with a motor (which may be a servo, stepper, or other motor) such as motor 126-*d* may be controlled by a variety of mechanisms, such as a microcontroller that may be integrated with aspects of the adjustment mechanism, the animal wearable device, or other components (such as a pendant). For example, FIG. 1C, FIG. 5C, and FIG. 6B provide systems and/or devices that may include a microcontroller 150 that is specifically called out in accordance with various embodiments. However, the other systems and/or devices of the other figures may also be utilized with microcontrollers in some embodiments.

Through combining a system and/or device with a microcontroller 150 and strap length adjustment mechanisms 120, the resulting system may be utilized to implement the application of force, such as tightening force that may be utilized to communicate one or more signals to an animal. In some embodiments, the adjustment mechanism 120 may be configured to adjust for an optimal tightness or fit for the animal wearing the animal wearable device 130 or system 101. This can help pet owners. For example, some people may be unsure of how tight an animal wearable device 130, such as an animal collar, should be. In some embodiments, the adjustment mechanism 120 may adjust the tightness through automation in software and motor 126 or may be a result of how a spring tensioning system may be implemented. The adjustment mechanism 120 may be implemented to automatically adjust to optimal tightness or may adjust while the plunger may be pressed and may not be under external force keeping it open greater than the tightening force. The microcontroller 150 may be utilized to determine the appropriate adjustments for the adjustment mechanism 120 to utilize for a variety of situations; this may be based on a variety of factors, such as measured tension with respect to the adjustment mechanism 120 and/or stored values with respect to the adjusted lengths of the one or more straps 110.

Some embodiments of the adjustment mechanism 120 may be used to measure tension as noted. This may include its "at rest" tightness and/or the increased tension if an animal may be pulling against a leash or other restraint. This may be useful for animal training and/or behavior monitoring.

Some embodiments of the adjustment mechanism 120 may measure the length of the strap(s) 110 by the rotation of the take-up spool 122. This measurement may give a reliable measure of neck size over time for health purposes, among other uses.

Some embodiments of the adjustment mechanism 120 may auto-adjust the strap(s) 110 to maintain balance. For example, one strap may spool up more on one side compared to the other to make one side have more mass due to the uneven distribution of the strap in the take-up spools. Some embodiments of the adjustment mechanism 120 may allow the strap(s) 110 to re-orient the animal wearable device 130 on the animal. For example, the adjustment mechanism 120 may loosen at specific times based on acceleration and other kinematic measurements and then may tighten in a new orientation relative to the animal. In some embodiments, the adjustment mechanism 120 may tighten or loosen based on times of day, such as during the daytime or during the nighttime. In some embodiments, the adjustment mechanism 120 may tighten or loosen based on the activity of an animal, such as when they eat, sleep, or engage in some other activity (playing, walking, running, sitting, etc).

Figure 3A:
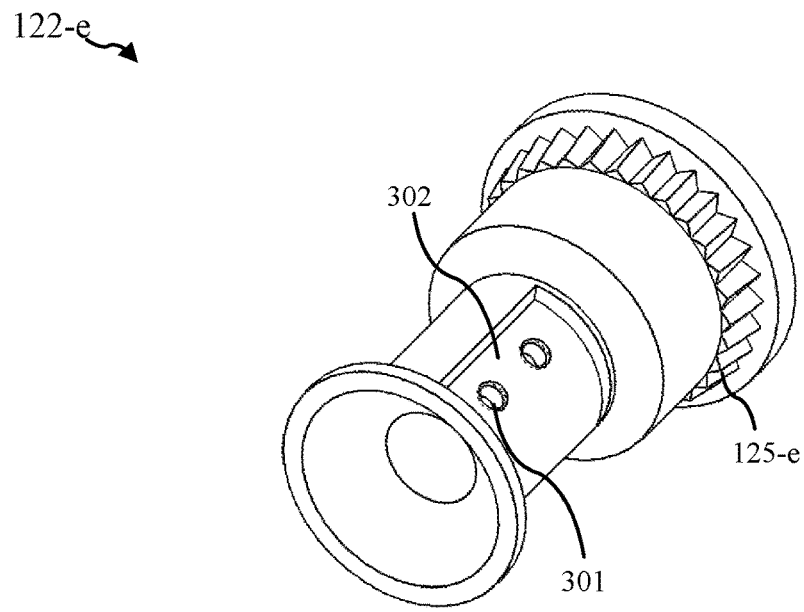
FIG. 3A and FIG. 3B show devices in accordance with various embodiments.
Figure 3B:
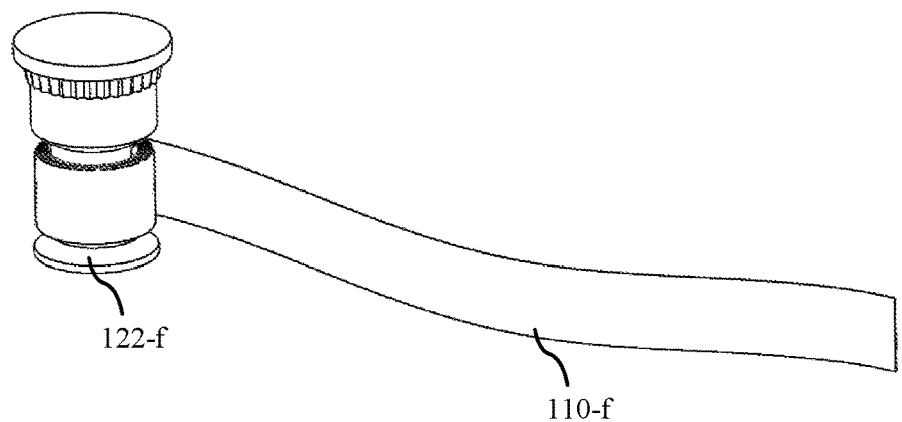

FIG. 3A shows an example of a take-up spool 122-e in accordance with various embodiments. Take-up spool 122-e may be an example of take-up spool 122 of FIGS. 1B-1C and/or FIGS. 2A-2F. For example, take-up spool 122-e may show splines 125-e, which may be utilized to lock rotation motion; in some embodiments, splines 125-e may be coupled with one or more gears coupled with a motor to facilitate rotating the take-up spool 122-e. Take-up spool 122-e may also include a recess 302 that may account for a securing method, such as to prevent a bump in a strap. Take-up spool 122-e may also include one or more holes 301 for double flush rivets to secure a strap to the take-up spool 122-e. The holes 301 may be threaded. Other methods and/or configurations may be utilized to couple a strap with the take-up spool 122-e. FIG. 3B shows an example of a take-up spool 122-f that may be coupled with a strap 110-f in accordance with various embodiments. Strap 110-f may be partially taken-up around take-up spool 122-f while a portion may be unfurled from the take-up spool 122-f. Take-up spool 122-f may be an example of take-up spool 122 of FIGS. 1B-1C, FIGS. 2A-2F, and/or FIG. 3A.

Figure 4:
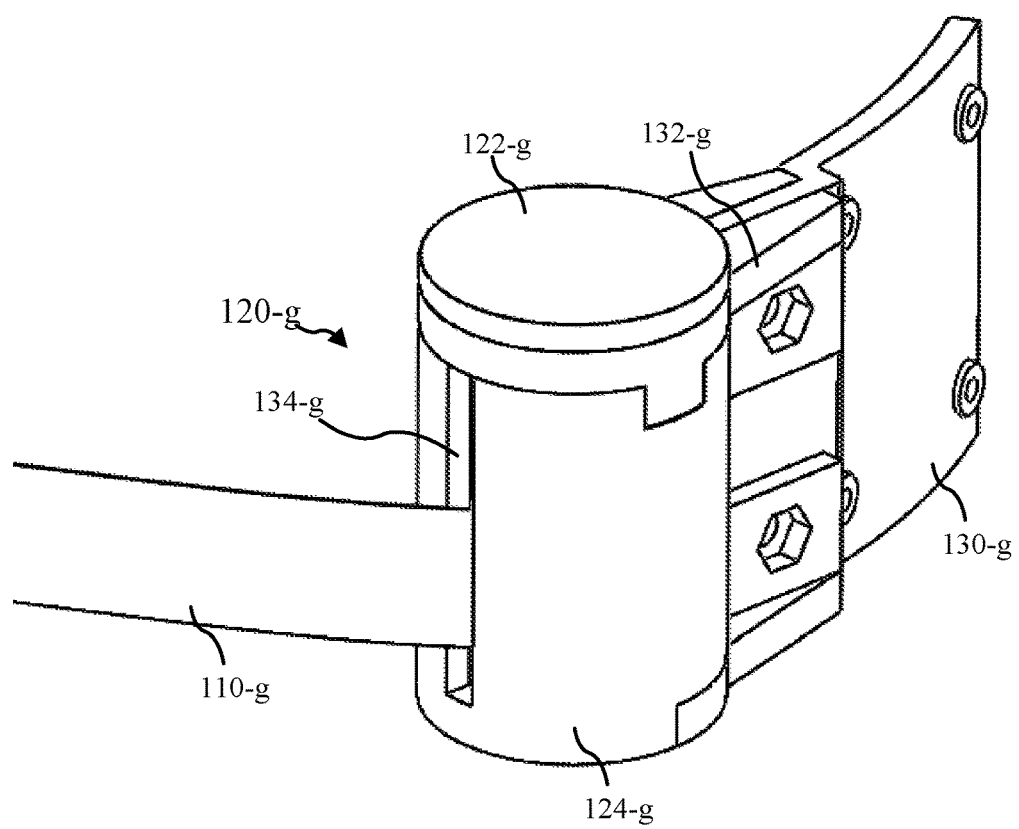
FIG. 4 shows a system and/or device in accordance with various embodiments.

FIG. 4 shows aspects of a system 101-g in accordance with various embodiments. System 101-g may show a strap 110-g that may extend through an aperture 134-g (shown as a slot) of an enclosure component 124-g of a strap length adjustment mechanism 120-g. FIG. 4 may also show a take-up spool 122-g. The strap length adjustment mechanism 120-g may be coupled with a portion of animal wear device 130-g, such as an animal collar, utilizing one or more connectors 132-g. System 101-g may be an example of aspects of system 100 of FIG. 1A, FIG. 1B, and/or FIG. 1C; strap length adjustment mechanism 120-g may be an example of strap length adjustment mechanism 120 of FIGS. 1A-1C, FIGS. 2A-2H, and/or FIGS. 3A-3B.

Figure 5A:
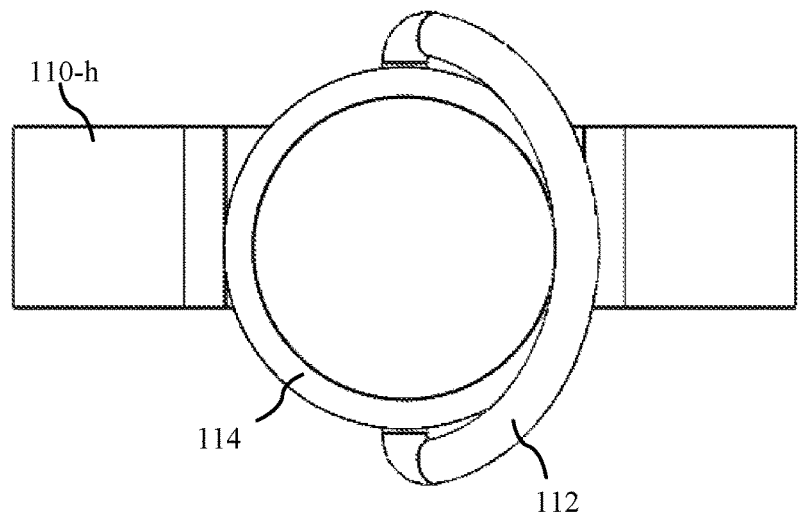
FIG. 5A, FIG. 5B, FIG. 5C, FIG. 5D, and FIG. 5E show systems and/or devices in accordance with various embodiments.
Figure 5B:
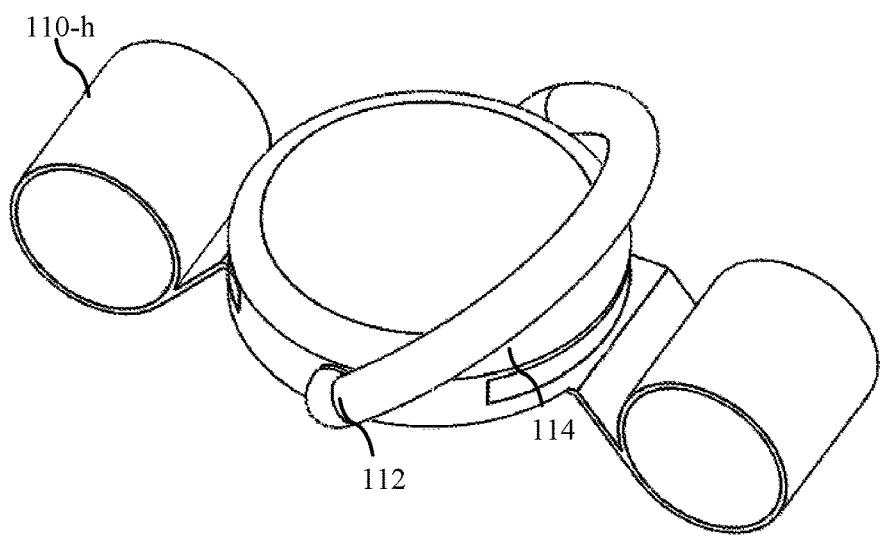
Figure 5C:
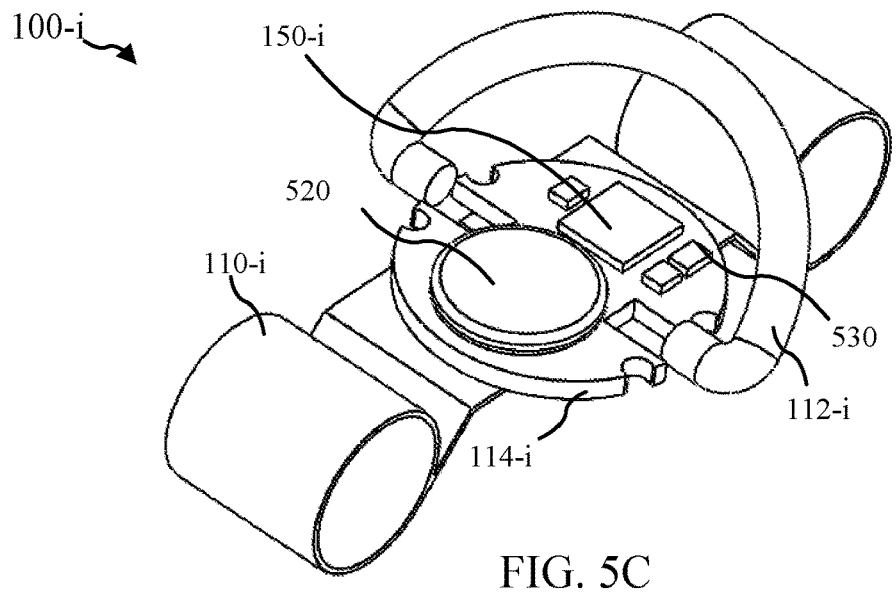

Turning now to FIG. 5A and FIG. 5B, aspects of a device 100-h are provided in accordance with various embodiments. For example, these figures may show one or more straps 110-h that may be coupled with a pendant 114; a leash attachment component 112, such as a D ring, may be coupled with the pendant 114 and/or the one or more straps 110-h. The one or more straps 110-h may be shown in a rolled-up state. Device 100-h may be integrated with strap length adjustment mechanisms 120 as shown with respect to FIGS. 1A-1C, FIGS. 2A-2H, FIGS. 3A-B, and/or FIG. 4.

FIG. 5C shows aspects of a device 100-i in accordance with various embodiments. For example, device 100-i may show one or more straps 110-i that may be coupled with a pendant 114-i; a leash attachment component 112-i, such as a D ring, may be coupled with the pendant 114-i and/or the one or more straps 110-i. Pendant 114-i may be utilized to contain different control components, such as a microcontroller 150-i, a battery 520, and/or inertial measurement unit 530; other components may be utilized in a variety of ways to communicate and/or to monitor an animal wearing the device 100-i. Device 100-i may be integrated with strap length adjustment mechanisms 120 as shown with respect to FIGS. 1A-1C, FIGS. 2A-2H, FIGS. 3A-B, and/or FIG. 4. Device 100-i may be an example of device 100-h of FIG. 5A.

Figure 5D:
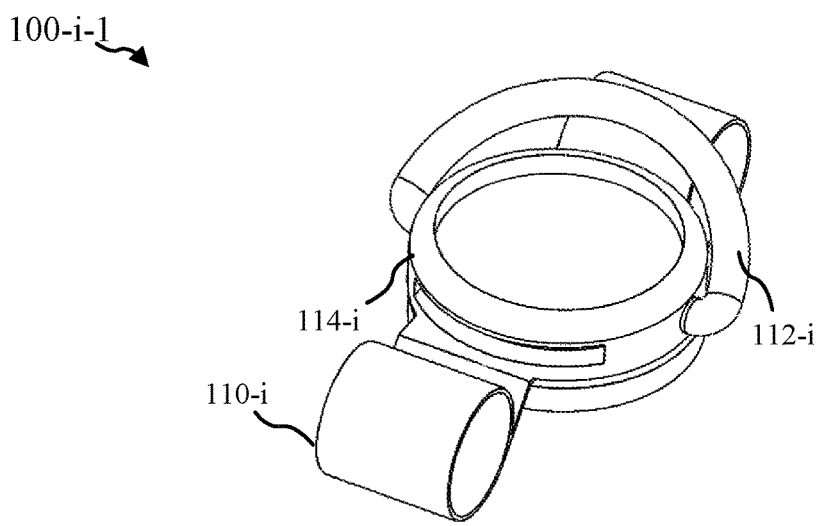

In some embodiments, the pendant 114-i may include a variety of other components, such as vibe motor, speaker, camera, antenna, etc. In some embodiments, information specific to identification such as RFID, real-time location, or other transmitters or record holders may be located in the pendant 114-i. In some embodiments, the pendant 114-i may communicate with an animal wearable device wirelessly, or through the strap as conductor of electrical signals, or carrier of optical signals, and/or other ways of transmitting signals. In some embodiments, the D-ring 112-i on the pendant 114-i may be removable. The D-ring 112-i on the pendant 114-i may be configured to lock into a flush position so it does not move around or make noise when it may not be needed. D-ring movement may be controlled by an animal wearable device or the pendant 114-i, from locked to unlocked. FIG. 5D may show a device 100-i-1 where the components of device 100-i of FIG. 5C may be enclosed within the pendant 114-i. In some embodiments, the pendant 114-i may be configured to hold identification information.

Figure 5E:
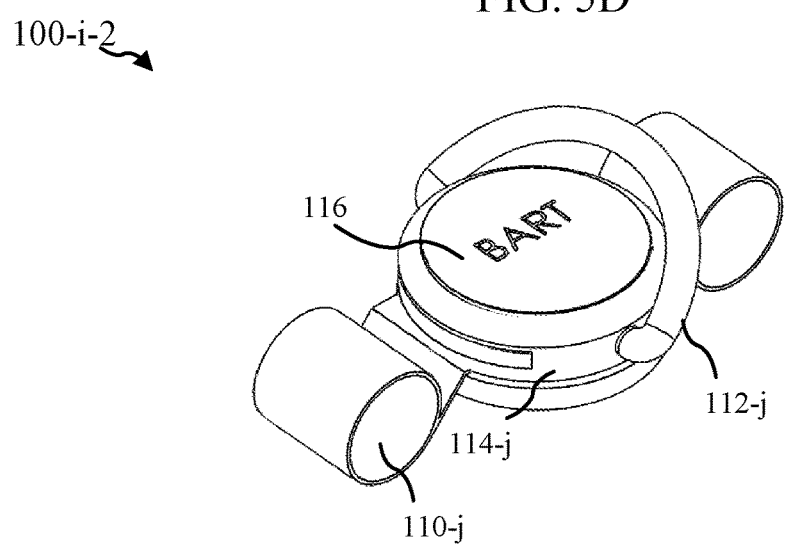

FIG. 5E shows aspects of a device 100-i-2 where identification information 116 may be provided on the outside of the pendant 114-j or within pendant 114-j. In some embodiments, the pendant 114-j may provide functional replacement for any type of wearable or implantable identification. In some embodiments, the pendant 114-j may be engraved. In some embodiments, the pendant 114-j be used as a container to hold a physical identification like a registration tag or rabies tag. The pendant 114-j may be clear so that the item can be viewed from the outside. Device 100-i-2 may be integrated with strap length adjustment mechanisms 120 as shown with respect to FIGS. 1A-1C, FIGS. 2A-2H, FIGS. 3A-B, and/or FIG. 4. Device 100-i-2 may be an example of aspects of device 100-h of FIG. 5A, device 100-i of FIG. 5C, and/or device 100-i-1 of FIG. 5D.

Figure 6A:
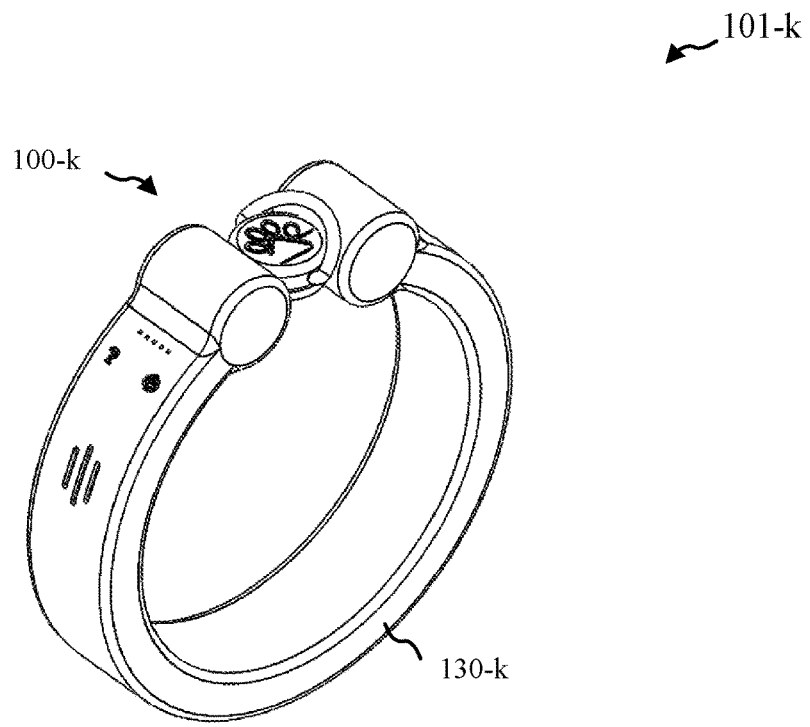
FIG. 6A, FIG. 6B, and FIG. 6C show systems and/or devices in accordance with various embodiments.
Figure 6B:
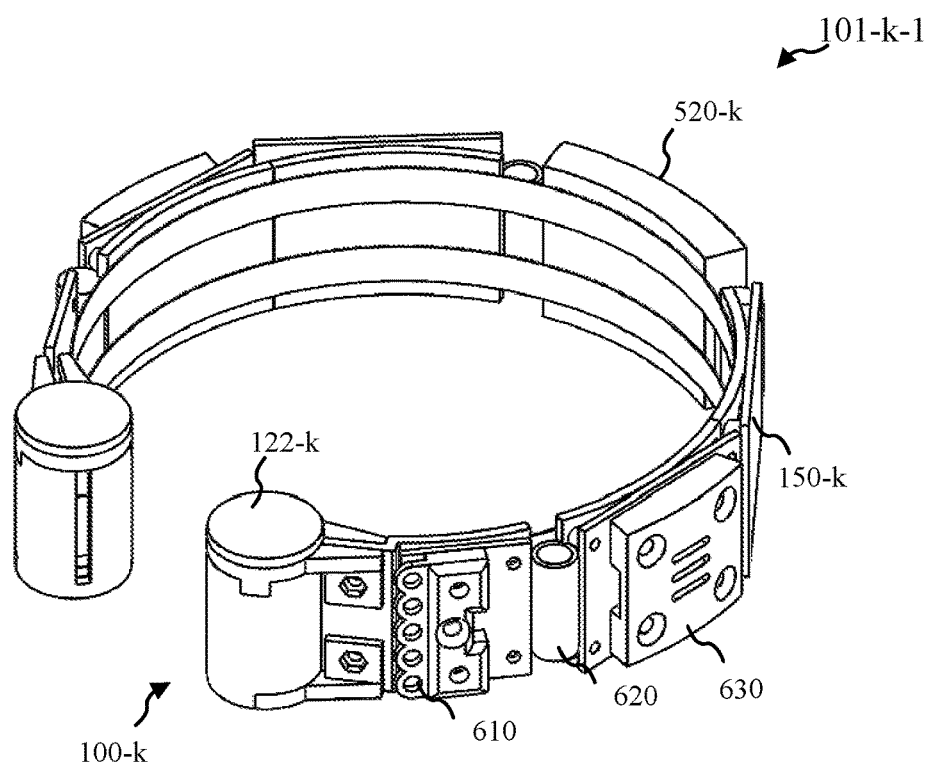

Turning now to FIG. 6A, a system 101-k in accordance with various embodiments is shown. System 101-k may be an example of system 101 of FIG. 1A, system 101-x of FIG. 1B, and/or system 101-y of FIG. 1C. System 101-k may include an animal wearable device 130-k, such an animal collar. System 101-k may also include an adjustment mechanism 100-k. Adjustment mechanism 100-k may be an example of devices 100 and/or strap length adjustment mechanisms 120 of FIGS. 1A-1C, FIGS. 2A-2H, FIGS. 3A-B, FIG. 4, and/or FIGS. 5A-5E. FIG. 6B shows aspects of system 101-k-1, which may reflect components of system 101-k, such as various components of animal wearable device 130-k and/or adjustment mechanism 100-k. For example, FIG. 6B shows multiple indicator LEDs 610, vibration motor 620, speaker 630, inertial measurement unit and/or microcontroller 150-k, and/or battery 520-k. FIG. 6B may also show take-up spool 122-k of adjustment mechanism 100-k; other components may be shown but not necessarily called out.

System 101-k-1 may provide a wide variety of ways to communicate with an animal, such as for training purposes such as through the use of vibration motor 620 or other stimulation components (including the adjustment mechanism 100-k in some embodiments). Stimulation components may include a variety of components such as vibration and/or force components. The stimulation components may be utilized to provide information to an animal wearing the system 101-k-1 for a variety of reasons, including, but not limited to, training, controlling, and/or protecting the animal. Through the use of multiple stimulation components, an animal may be provided more information than mere binary communication (on/off), as may be provided by other devices such as shock collars. The multiple stimulation components may be positioned on different portions of the animal wearable device 130-*k*. Some embodiments may utilize other stimulation components such as lights 610 and/or speaker 630.

In some embodiments, the microcontroller 150-*k* may be coupled with one or more stimulation components (e.g. vibration motor 620 and/or adjustment mechanism 100-*k*) such that they may be separated and/or independently controlled. The microcontroller 150-*k* may be used to control the system 101-*k*-1 including, but not limited to, determining the type and location of stimulation to be passed to the animal as well as obtaining feedback and sensor information from the animal. The microcontroller 150-*k* also may control the manner in which the stimulation and feedback may be passed. The microcontroller 150-*k* may also include communication functionality for transmitting and receiving information between the system 100-*k*-1 and an external device used by a human, such as a trainer or owner, for example. The microcontroller 150-*k* can include one or more processors, memory, controllers, data input/output ports, transmitters, receivers, and the like. Hardware and software can be used to cause the microcontroller 150-*k* to perform its different functions.

The microcontroller 150-*k* may utilize a variety of technologies constructed in part using components such as batteries, microprocessors, graphics processors, flash memory, cellular telephony, Wi-Fi, Bluetooth, Near Field Communication (NFC), Global Positioning System (GPS), Accelerometers, Gyroscopes, magnetometers, thermometers, lights, buttons, speakers, microphones, cameras, heart rate monitors, antennas, and ports including USB and other varieties. As noted above, the microcontroller 150-*k* may also include an inertial measurement unit. These components can be arranged and interconnected in a variety of ways. In addition, typical software can be used, where desired, in conjunction with these components. In some embodiments, the microcontroller 150-*k* includes: a microprocessor; a memory; and/or wireless communication component configured at least to receive commands from a user device. The microcontroller 150-*k* may be further configured to wirelessly transmit feedback to the user device using the wireless communication component.

In some embodiments, stimulation components 620 include multiple vibration components. In some embodiments, the multiple stimulation components include multiple force components. In some embodiments, the multiple vibration and/or force components includes a first vibration and/or force component coupled with a first portion of the animal wearable device 130-*k* and a second vibration and/or force component coupled with a second portion of the animal wearable device 130-*k* such that the first portion and the second portion are configured to be on opposites sides of an animal, such as opposite sides of an animal's neck or torso. The adjustment mechanism 100-*k* may also be utilized for purposes similar to vibration and/or force components through tightening and/or loosening the mechanism.

In some embodiments, the simulation component(s) 620 provide signals based on at least amplitude modulation, pulse duration, or pulse occurrence. In some embodiments, the stimulation component(s) 62—are coordinated with each other so as to provide a pattern. The pattern may include vibrating out-of-phase at least two vibration components from the simulation component(s) on opposite sides of an animal.

Figure 6C:
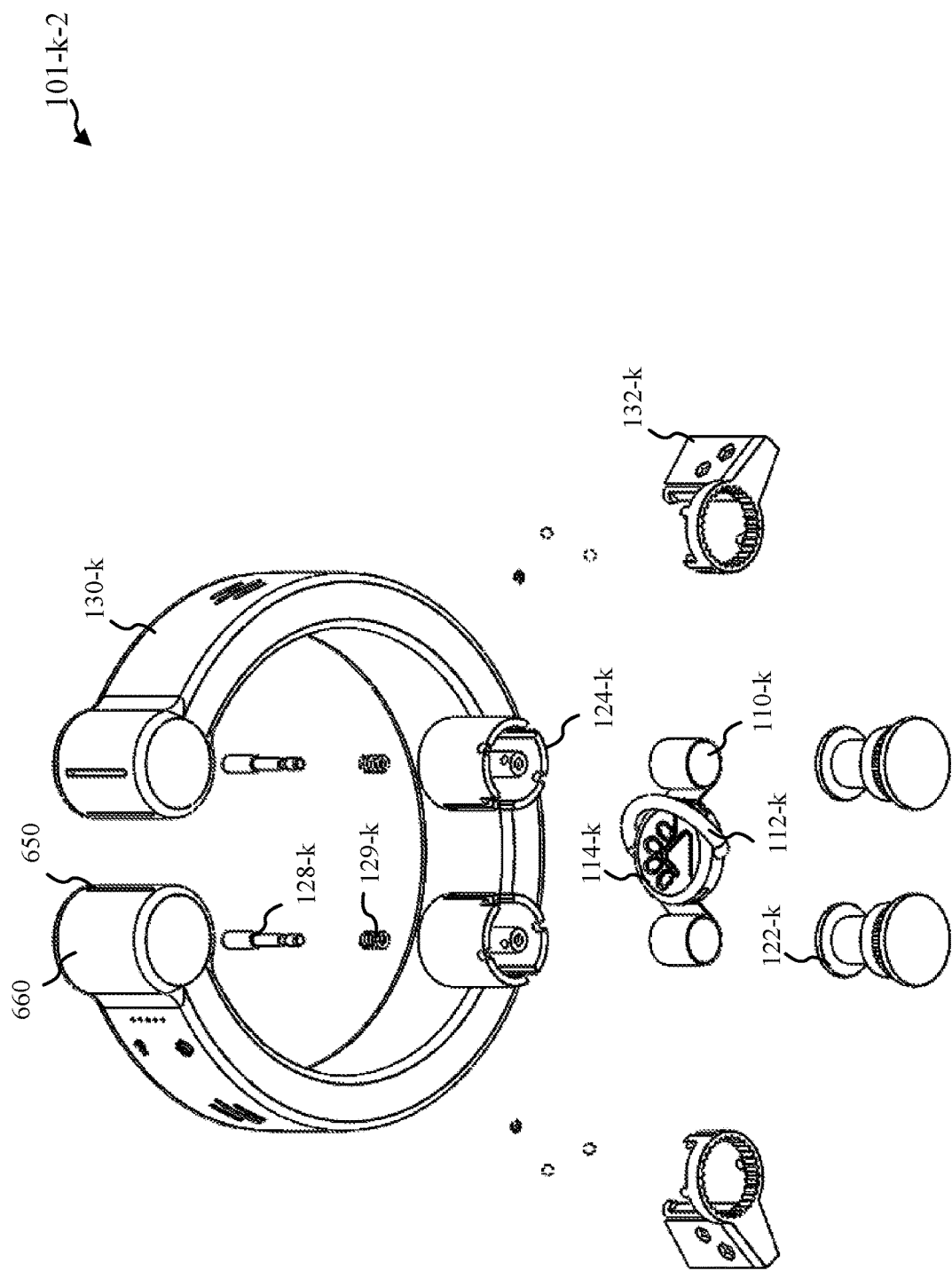

FIG. 6C shows an exploded view of aspects of system 101-*k*-2, which may reflect aspects of systems 101-*k* and/or 101-*k*-1. For example, the exploded view may show components of the adjustment mechanism 100-*k*, which may include one or more take-up spools 122-*k*, one or more straps 110-*k*, one or more spring loaded plungers 128-*k* (with spring 129-*k*), one or more enclosure components 124-*k*, one or more leash attachment components 112-*k*, and pendant 114-*k*. FIG. 6C may also show portions of an animal wearable device 130-*k*, which may include one or more overmolding portions 660 (with one or more apertures or slits 650) that may couple with one or more aspects of the adjustment mechanism 100-*k*. In some embodiments, pendant 114-*k* may be configured to house components that may be housed with respect to animal wearable device 130-*k*, such as indicator LEDs, vibration motor(s), speaker(s), inertial measurement unit(s), microcontroller(s), and/or one or more batteries. System 101-*k*-2 may include one or more connectors 132-*k* that may be utilized to connect the adjustment mechanism 100-*k* with the animal wearable device 130-*k*; the one or more connectors 132-*k* may be utilized also to anchor or lock the one or more take-up spools 122-*k* in particular positions in some cases through the use of meshing splines.

Turning now to FIG. 7A, FIG. 7B, and FIG. 7C, several different configurations of systems 101-*l*, 101-*m*, and 101-*n*, respectively, that may include overmolding portions 660-*l*, 660-*m*, 660-*n*, respectively, are provided in accordance with various embodiments. Each overmolding portion 660-*l*, 660-*m*, and/or 660-*n* may be configured to hold a portion of an adjustment mechanism (a take-up spool 122-*l*, 122-*m*, 122-*n*, respectively, of each adjustment mechanism may be shown; other components may be obscured from view). Each overmolding portion 660-*l*, 660-*m*, and/or 660-*n* may be formed from or attached to an end portion of an animal wearable device 130-*l*, 130-*m*, 130-*n*, respectively. FIG. 7A shows an example where the overmolding portion 660-*l* may include an aperture 650-*l* (shown as a slid) through which a strap may be extended. FIG. 7B shows an example where the overmolding portion 660-*m* may include a slit 650-*m* through which a strap may be extended; the slit 650-*m* may extend to an edge of the overmolding portion 660-*m* such that the strap may be slid out through the top of the slit 650-*m*, which may facilitate removal of the strap and/or the take-up spool 122-*m*. FIG. 7C shows an example where the overmolding portion 660-*n* may include an aperture 650-*n*-1 through which a strap may be extended along with a slit 650-*n*-2 that may extend to an edge of the overmolding portion 660-*n*, which may facilitate removal of the strap and/or take-up spool 122-*n*. Systems 101-*l*, 101-*m*, and/or 101-*n* may be examples of aspects of system 101 of FIGS. 1A-1C and/or FIGS. 6A-6C and may include aspects of devices 100 and/or devices 120 of FIGS. 2A-H, FIGS. 3A-3B, FIG. 4, FIGS. 5A-5E, and/or FIGS. 6A-6C.

Figure 8:
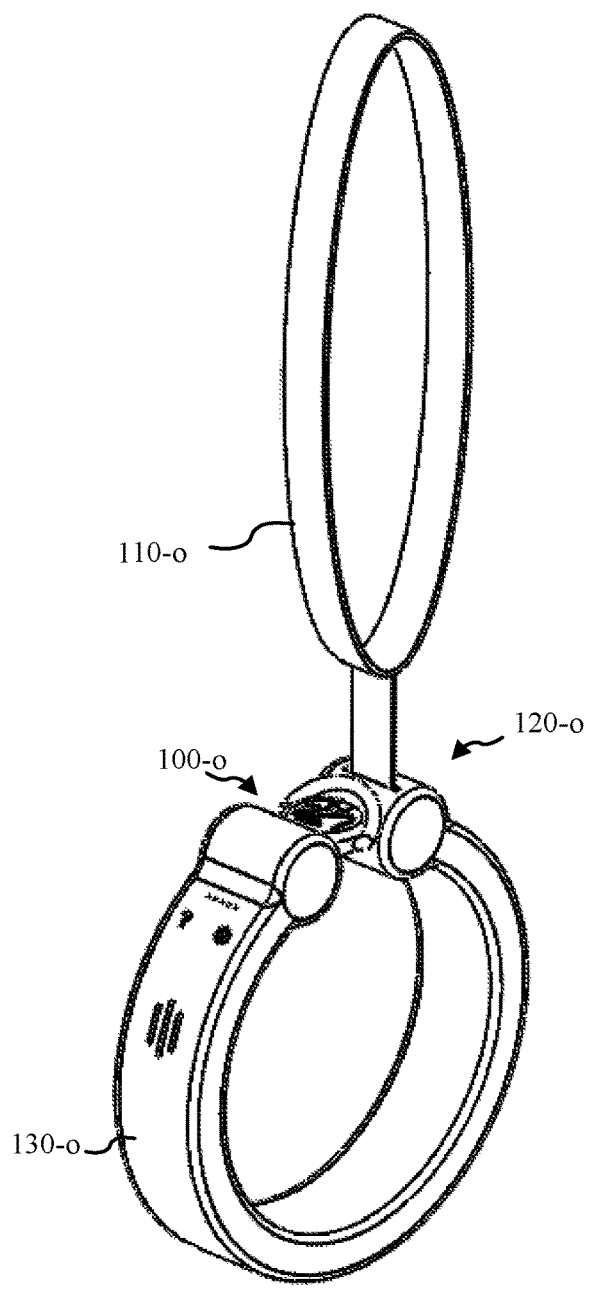
FIG. 8 shows systems and/or devices in accordance with various embodiments.

FIG. 8 shows an example of a system 101-*b* in accordance with various embodiments. System 101-*b* may provide an example where a strap length adjustment mechanism 120-*o* may be utilized to adjust a length of a leash 110-*o* and/or one or more straps. System 101-*b* may also show an animal wearable device 130-*o*, such as an animal collar. System 101-*b* may include other adjustment mechanism 100-*o*, that may be utilized to adjust the fit of the animal wearable device 130-*o*. Strap length adjustment mechanism 120-*o* may be an example of strap length adjustment mechanism 120 of FIGS. 1A-1C, FIGS. 2A-2H, FIGS. 3A-B, FIG. 4, FIGS. 5A-5E, FIGS. 6A-6C, and/or FIGS. 7A-7C. Device 100-*o* may be an example of aspects of device 100, device 120, and/or their respect components of FIGS. 1A-1C, FIGS. 2A-2H, FIGS. 3A-B, FIG. 4, FIGS. 5A-5E, FIGS. 6A-6C, and/or FIGS. 7A-7C.

Turning now to FIG. 9, a flow diagram of a method 900 is shown in accordance with various embodiments. Method 900 may be implemented utilizing a variety of systems and/or devices such as those shown and/or described with respect to FIGS. 1A-1C, FIGS. 2A-2H, FIGS. 3A-B, FIG. 4, FIGS. 5A-5E, FIGS. 6A-6C, FIGS. 7A-7C, and/or FIG. 8.

At block 910, a fit of an animal wearable device may be adjusted utilizing one or more strap length adjustment mechanisms. In some embodiments, adjusting the fit of the animal wearable device utilizing the one or more strap length adjustment mechanisms includes rotating a take-up spool coupled with an end of a strap. The animal wearable device may include an animal collar; other examples of animal wearable devices may include, but are not limited to, animal harnesses and/or bridles. Some embodiments include passing a length of the strap through at least an aperture (such as a slit) of an overmolding portion of the animal wearable device.

In some embodiments of method 900, adjusting the fit of the animal wearable device utilizing the one or more strap length adjustment mechanisms includes utilizing one or more tension components coupled with the take-up spool to facilitate spooling a portion of the strap around the take-up spool. The one or more tension components may include one or more springs.

In some embodiments of method 900, adjusting the fit of the animal wearable device utilizing the one or more strap length adjustment mechanisms includes utilizing a spring-loaded plunger configured to facilitate at least locking, adjusting, or removing the take-up spool. Some embodiments include locking a position of the take-up spool after adjusting the fit of the animal wearable device.

In some embodiments of method 900, adjusting the fit of the animal wearable device utilizing the one or more strap length adjustment mechanism includes utilizing a motor coupled with the take-up spool. Some embodiments include controlling the motor utilizing a microcontroller.

Method 900 may utilize the one or more strap length adjustment mechanisms with motor(s) that may be coupled with the microcontroller that may allow for methods that implement the application of force, such as tightening force that may be utilized to communicate one or more signals to an animal. Adjusting the fit of the animal wearable device utilizing the one or more strap length adjustment mechanisms may be configured to adjust for an optimal tightness or fit for the animal wearing the device or system. This can help pet owners. For example, some people may be unsure of how tight an animal wearable device, such as an animal collar, should be.

Adjusting the fit of the animal wearable device utilizing the one or more strap length adjustment mechanisms may adjust the tightness through automation in software through microcontroller and motor or may be a result of how a spring tensioning system may be implemented. Adjusting the fit of the animal wearable device utilizing the one or more strap length adjustment mechanisms may be implemented to automatically adjust to optimal tightness or may adjust while the plunger may be pressed and may not be under external force keeping it open greater than the tightening force. The microcontroller may be utilized to determine the appropriate adjustments for the one or more strap length adjustment mechanism to utilize for a variety of situations; this may be based on a variety of factors, such as measured tension with respect to the one or more strap length adjustment mechanisms and/or stored values with respect to the adjusted lengths of the one or more straps.

Adjusting the fit of the animal wearable device utilizing the one or more strap length adjustment mechanisms may be used to measure tension as noted. This may include its "at rest" tightness and/or the increased tension if an animal may be pulling against a leash or other restraint. This may be useful for animal training and/or behavior monitoring.

Adjusting the fit of the animal wearable device utilizing the one or more strap length adjustment mechanisms may measure the length of the strap(s) by the rotation of the take-up spool. This measurement may give a reliable measure of neck size over time for health purposes, among other uses.

Adjusting the fit of the animal wearable device utilizing the one or more strap length adjustment mechanisms may auto-adjust the strap(s) to maintain balance. For example, one strap may spool up more on one side compared to the other to make one side have more mass due to the uneven distribution of the strap in the take-up spools. Adjusting the fit of the animal wearable device utilizing the one or more strap length adjustment mechanisms may adjust the strap(s) to re-orient the animal wearable device on the animal. Adjusting the fit of the animal wearable device utilizing the one or more strap length adjustment mechanisms may loosen at specific times based on acceleration and other kinematic measurements and then may tighten in a new orientation relative to the animal. Adjusting the fit of the animal wearable device utilizing the one or more strap length adjustment mechanisms may tighten or loosen based on times of day, such as during the daytime or during the nighttime.

These embodiments may not capture the full extent of combinations and permutations of materials and process equipment. However, they may demonstrate the range of applicability of the methods, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A system comprising:
an animal collar;
one or more straps; and
one or more strap length adjustment mechanisms coupled with the one or more straps, wherein the one or more strap length adjustment mechanisms are coupled with the animal collar such that the one or more strap length adjustment mechanisms adjust a fit of the animal collar around a neck of the animal based on a neck size of the animal, wherein a first strap length adjustment mechanism from the one or more strap length adjustment mechanisms is coupled with a first end of the animal collar and a second strap length adjustment mechanism from the one or more strap length adjustment mechanisms is coupled with a mechanism from the one or more strap length adjustment mechanisms is coupled with a second end of the animal collar.

2. A system comprising:
an animal collar;
one or more straps; and
one or more strap length adjustment mechanisms coupled with the one or more straps, wherein the one or more strap length adjustment mechanisms are coupled with the animal collar such that the one or more strap length adjustment mechanisms adjust a fit of the animal collar around a neck of the animal based on a neck size of the animal, wherein each of one or more strap length adjustment mechanisms include a take-up spool coupled with an end of at least one of the one or more straps.

3. The system of claim 2, wherein the each of the one or more strap length adjustment mechanisms include an enclosure component configured to hold a portion of the take-up spool and a portion of at least one of the one or more straps.

4. The system of claim 2, further comprising one or more tension components coupled with the take-up spool to facilitate spooling a portion of the one or more straps around the take-up spool.

5. The system of claim 4, wherein the one or more tension components include one or more springs.

6. The system of claim 2, wherein the take-up spool is configured to adjust an extended length of at least one of the one or more straps.

7. The system of claim 6, wherein the one or more strap length adjustment mechanisms are configured to maintain the adjusted extended length of the one or more straps.

8. The system of claim 2, wherein the one or more strap length adjustment mechanisms are configured for at least removal of the take-up spool or replacement of the one or more straps.

9. The system of claim 2, wherein the one or more strap length adjustment mechanisms include a spring-loaded plunger configured to facilitate at least locking, adjusting, or removing the take-up spool.

10. The system of claim 9, further comprising a spring configured to push up the take-up spool when the spring-loaded plunger is pushed.

11. The system of claim 2, wherein the take-up spool includes one or more splines to facilitate locking the take-up spool.

12. The system of claim 1, further comprising a leash attachment component coupled with the one or more straps.

13. The system of claim 12, wherein the leash attachment component includes a D ring.

14. The system of claim 2, wherein the one or more strap length adjustment mechanisms include one or more motors coupled with the one or more take-up spools.

15. The system of claim 14, further comprising a microcontroller that controls the one or more motors.

16. A system comprising:
an animal collar;
one or more straps; and
one or more strap length adjustment mechanisms coupled with the one or more straps, wherein the one or more strap length adjustment mechanisms are coupled with the animal collar such that the one or more strap length adjustment mechanisms adjust a fit of the animal collar around a neck of the animal based on a neck size of the animal, wherein the animal collar includes one or more overmolding portions configured to couple with the one or more strap length adjustment mechanisms and wherein the one or more overmolding portions include at least one or more apertures configured for the one or more straps at least to pass through the overmolding portions or to be removed from the overmolding portions.

* * * * *